United States Patent
Benz et al.

(10) Patent No.: US 9,869,246 B2
(45) Date of Patent: Jan. 16, 2018

(54) GAS TURBINE POWER PLANT WITH EXHAUST GAS RECIRCULATION

(71) Applicant: ALSTOM Technology Ltd, Baden (CH)

(72) Inventors: Eribert Benz, Birmenstorf (CH); Jaan Hellat, Zumikon (CH); Hans Wettstein, Fislisbach (CH); Robin Payne, Wettingen (CH)

(73) Assignee: ANSALDO ENERGIA SWITZERLAND AG, Baden (CH)

(*) Notice: Subject to any disclaimer, the term of this patent is extended or adjusted under 35 U.S.C. 154(b) by 343 days.

(21) Appl. No.: 14/467,648

(22) Filed: Aug. 25, 2014

(65) Prior Publication Data
US 2014/0360200 A1 Dec. 11, 2014

Related U.S. Application Data

(63) Continuation of application No. PCT/EP2013/053999, filed on Feb. 28, 2013.

(30) Foreign Application Priority Data

Feb. 29, 2012 (CH) ..................... 0272/12

(51) Int. Cl.
*F02C 1/00* (2006.01)
*F02C 1/08* (2006.01)
(Continued)

(52) U.S. Cl.
CPC ............. *F02C 3/34* (2013.01); *F01K 13/02* (2013.01); *F01K 23/10* (2013.01); *F01K 23/101* (2013.01);
(Continued)

(58) Field of Classification Search
CPC .... F02C 1/005; F02C 1/08; F02C 3/34; F02C 7/04; F02C 7/042; F02C 7/057
See application file for complete search history.

(56) References Cited

U.S. PATENT DOCUMENTS 3,703,807 A 11/1972 Rice
4,133,171 A 1/1979 Earnest et al.
(Continued)

FOREIGN PATENT DOCUMENTS

CH 701 236 A1 12/2010
DE 1 262 074 B 2/1968
(Continued)

OTHER PUBLICATIONS

Office Action (Notification of Reasons for Refusal) dated Aug. 17, 2015, by the Japanese Patent Office in corresponding Japanese Patent Application No. 2014-559207, and an English Translation of the Office Action. (7 pages).
(Continued)

*Primary Examiner* — Gerald L Sung
*Assistant Examiner* — Scott Walthour
(74) *Attorney, Agent, or Firm* — Buchanan Ingersoll & Rooney PC

(57) ABSTRACT

A method for operating a gas turbine power plant, and a gas turbine power plant in which fresh air is delivered to a compressor inlet and is accelerated in the compressor inlet and a recirculated first exhaust gas substream is delivered into a region of the compressor inlet in which the fresh air is accelerated to an extent such that the difference between total pressure and static pressure in the fresh air is greater than or equal to a pressure difference which is required in order to suck a target mass flow of the recirculated first exhaust gas substream into the compressor inlet.

4 Claims, 5 Drawing Sheets

(51) Int. Cl.
*F02C 3/34* (2006.01)
*F02C 7/04* (2006.01)
*F02C 7/042* (2006.01)
*F02C 7/057* (2006.01)
*F01K 13/02* (2006.01)
*F01K 23/10* (2006.01)
*F02C 6/18* (2006.01)

(52) U.S. Cl.
CPC .............. *F02C 1/005* (2013.01); *F02C 1/08* (2013.01); *F02C 6/18* (2013.01); *F02C 7/04* (2013.01); *F02C 7/042* (2013.01); *F02C 7/057* (2013.01); *F05D 2220/60* (2013.01); *F05D 2270/20* (2013.01)

(56) References Cited

U.S. PATENT DOCUMENTS

| | | |
|---|---|---|
| 6,308,513 B1 | 10/2001 | Hatanaka |
| 7,536,252 B1 | 5/2009 | Hibshman, II et al. |
| 2007/0034704 A1 | 2/2007 | Hu et al. |
| 2007/0227118 A1 | 10/2007 | Hu et al. |
| 2009/0107141 A1* | 4/2009 | Chillar ................ F02C 1/08 60/605.2 |
| 2010/0115960 A1* | 5/2010 | Brautsch ............... F02C 3/30 60/772 |
| 2011/0289898 A1 | 12/2011 | Hellat et al. |
| 2011/0289899 A1 | 12/2011 | De La Cruz Garcia et al. |

FOREIGN PATENT DOCUMENTS

| | | |
|---|---|---|
| EP | 0 718 470 A2 | 6/1996 |
| EP | 2 248 999 A1 | 11/2010 |
| JP | 2011-247264 A | 12/2011 |
| WO | 2010/142573 A2 | 12/2010 |

OTHER PUBLICATIONS

Office Action dated Sep. 6, 2015, by the State Intellectual Property Office, P.R. China in corresponding Chinese Patent Application No. 201380011682.X, and an English Translation of the Office Action. (23 pages).

* cited by examiner

GAS TURBINE POWER PLANT WITH EXHAUST GAS RECIRCULATION

CROSS-REFERENCE TO RELATED APPLICATIONS

This application claims priority to PCT/EP2013/053999 filed Feb. 28, 2013, which claims priority to Swiss application 00272/12 filed Feb. 29, 2012, both of which are hereby incorporated in their entireties.

TECHNICAL FIELD

The present disclosure relates to a method for operating a gas turbine with two entry streams of different gas compositions and to a gas turbine having a divided compressor entry.

BACKGROUND

Recirculation is a technology which can be employed basically for the most diverse possible purposes in gas turbines. Thus, for example, for controlling the emissions, reducing the exhaust gas volume for carbon dioxide separation, etc. In recirculation of exhaust gases in a gas turbine, a substantial fraction of the exhaust gas is branched off from the overall exhaust gas substream and is normally delivered again, after cooling and purification, to the mass entry stream of the turbine or to the turbine compressor. The exhaust gas composition differs considerably from the composition of fresh ambient air. Conventionally, the recirculated exhaust gas substream is mixed with fresh air from the surroundings and this mixture is subsequently delivered to the compressor.

Advantageously, by exhaust gas recirculation, the carbon dioxide partial pressure in the exhaust gases can be increased, in order to reduce the power losses and efficiency losses of power plants having carbon dioxide separation. Further, exhaust gas recirculation has been proposed for the purpose of reducing the oxygen content in the intake gases of gas turbines, in order thereby to reduce the NOx emissions.

For exhaust gas recirculation, for example, U.S. Pat. No. 7,536,252 B1 describes a method for controlling an exhaust gas recirculation stream of a turbo machine, which is returned to the inlet of the turbo machine via an exhaust gas recirculation system. In this method, a desired exhaust gas recirculation fraction, which contains the fraction of the exhaust gas substream in the entry stream of the turbo machine, is determined, and the actual value is set to the desired value.

EP2248999 discloses a power plant with exhaust gas recirculation and a method for operating a power plant of this type, in that the recirculation rate and the temperature to which the recirculated exhaust gases are recooled are controlleded as a function of the load.

In order to make recirculation of exhaust gases possible, it is proposed in the prior art to provide blowers in order to overcome the pressure losses in the recirculation line, in the recooler for the recirculated exhaust gases, etc. Alternatively, there are versions in which the recirculation line, the cooler for the recirculated exhaust gases, etc. are designed to be so large that the flow velocities and therefore the pressure losses are so low that overpressure in the exhaust gas lines is sufficient to return the exhaust gases. Both solutions are large and costly and require additional space in a power plant. In particular, the use of a blower is further detrimental to the power and efficiency of the power plant.

SUMMARY

One aim of the present disclosure is to specify a method for the reliable operation of a gas turbine with exhaust gas recirculation, without the use of a blower to overcome the pressure losses of the recirculation lines.

Further, a gas turbine power plant which is suitable for implementing the method is the subject of the disclosure.

A gas turbine power plant with exhaust gas recirculation comprises a gas turbine, a waste heat recovery steam generator, an exhaust gas divider, which divides the exhaust gases into a first exhaust gas substream for recirculation into an intake stream of the gas turbine and into a second exhaust gas substream for discharge into the surroundings, and also a recirculation line. Typically, at least one exhaust gas recooler is arranged in the recirculation lines.

The gas turbine comprises a compressor with an entry cross section, a combustion chamber which follows the compressor and in which the compressed gases are burnt with fuel, and a turbine, in which the hot combustion gases are expanded, and also a shaft.

The disclosed method is distinguished in that a target mass flow for the recirculated first exhaust gas substream is stipulated, and the recirculated first exhaust gas substream is delivered into a region of the compressor inlet in which the fresh air intake stream is accelerated to an extent such that the difference between total pressure and static pressure is greater than or equal to the pressure difference which is required in order to suck a target mass flow of the recirculated first exhaust gas substream into the compressor inlet.

By the static pressure in the intake flow of the compressor being lowered, the pressure difference for recirculation of the exhaust gases is increased and an exhaust gas blower can be dispensed with.

The target mass flow may, for the sake of simplification, be stipulated as a fixed value or be determined as a function of the operating conditions of the gas turbine. The target mass flow may be stipulated as an absolute value or be stipulated as a relative value with respect to a current state. For example, it may be determined proportionally to a desired-value/actual-value deviation of a concentration, of a temperature, of a combustion chamber pulsation or of another variable.

Typically, the recirculated first exhaust gas substream is delivered into a region of the compressor inlet in which the intake stream of the fresh air is accelerated to an extent such that the difference between total pressure and static pressure is greater than 1% of the total pressure.

According to one version of the method, the recirculated first exhaust gas substream is delivered into a region of the compressor inlet in which the intake flow is accelerated to an extent such that the difference between ambient pressure and static pressure is greater than the difference between the sum of the pressure losses in the recirculation line and all the fittings in the recirculation line and overpressure in the exhaust gas divider with respect to ambient pressure.

Typically, the static pressure in the exhaust gas divider is higher than the ambient pressure, in order to overcome pressure losses in the following exhaust gas lines and in the exhaust gas treatment devices, such as, for example, $CO_2$ separation, which precedes the chimney. Overall, therefore, the pressure can be increased for delivering the recirculated exhaust gases into the compressor inlet.

On account of the high acceleration of the compressor intake flow prior to the entry into the compressor, in particular in the entry nozzle (also called bellmouth) or directly upstream of the inlet nozzle, a pronounced pressure gradient in the compressor inlet prior to the compressor entry is obtained. By changing the location at which the recirculated first exhaust gas substream is delivered to the compressor inlet, the driving pressure gradient and therefore the quantity of the recirculated first exhaust gas substream can be open loop or close loop controlled. The nearer to the compressor entry the recirculated first exhaust gas substream is delivered, the greater is the driving pressure gradient and therefore the quantity of the recirculated first exhaust gas substream.

In addition to the location at which the recirculated first exhaust gas substream is conducted into the compressor inlet, the outlet area of the recirculation line or of that sector of the compressor inlet via which the recirculated first exhaust gas substream is returned determines the recirculated first exhaust gas substream. The larger the outlet area is, the larger the recirculated first exhaust gas substream becomes. According to one version of the method, the quantity of the recirculated first exhaust gas substream is open loop or close loop controlled by changing the cross-sectional area of the outlet from which the first exhaust gas substream is delivered to the compressor inlet.

According to a further version of the method, the fresh air and the recirculated first exhaust gas substream are delivered to the compressor coaxially to one another through the compressor inlet.

According to yet another version of this method, the fresh air and the recirculated first exhaust gas substream are delivered to the compressor via concentric circular rings through the compressor inlet.

According to yet another version of this method, the first exhaust gas substream is delivered through the compressor inlet via the radially inner circular ring.

In order to set the quantity of the recirculated first exhaust gas substream, according to a further embodiment of the method regulation or control is carried out by a variable separation element which is arranged in the compressor inlet and which separates the flow duct of the fresh air from the flow duct of the recirculated first exhaust gas substream. For regulation or control, the geometry at the outlet of the variable separation element is adjusted. This adjustment may be a movement or displacement in any direction, as a result of which the pressure and flow conditions at the outlet of the separation element are varied.

According to one embodiment, the variable separation element is displaceable in the axial direction. By variation in the axial position of the variable separation element, in particular of the outlet end of the variable separation element, the quantity of the recirculated first exhaust gas substream is open loop or close loop controlled.

According to a further embodiment of the method, the quantity of the recirculated first exhaust gas substream is open loop or close loop controlled by a variable separation element displaceable in the radial direction. By radical displacement of the variable separation element, the outlet area through which the recirculated first exhaust gas substream is delivered to the compressor entry is open loop or close loop controlled in order to regulate or control the recirculated first exhaust gas substream.

The delivery of the recirculated first exhaust gas substream into the compressor inlet may take place both via one coherent outlet area of a flow duct and via a multiplicity of outlet areas from one flow duct or from a multiplicity of flow ducts. According to an exemplary embodiment, the recirculated first exhaust gas substream is introduced via feeders arranged so as to be distributed in the circumferential direction concentrically to the shaft of the gas turbine upstream of the compressor inlet. In this exemplary embodiment the quantity of the recirculated first exhaust gas substream is open loop or close loop controlled by changing the axial position of the outlet orifice of the feeders in the compressor inlet.

Depending on the operating concept and the gas turbine, exhaust gas recirculation is switched off or reduced for starting the gas turbine and when the latter is under part load. This is necessary, for example, in order to ensure stable low-CO (low-carbon monoxide) combustion or, during the ignition operation, to avoid the recirculation of unburnt fuel into the intake stream of the gas turbine. Depending on the division of the entry cross section into sectors, via which fresh air is delivered, and sectors, via which recirculated exhaust gases are returned, an incorrect compressor approach flow may occur when the exhaust gas recirculation is reduced. In order to avoid this incorrect approach flow, according to one version of the method, when the gas turbine is being started or is under part load, fresh air is admixed to the recirculated first exhaust gas substream before the latter is introduced into the compressor. The admixture of fresh air is open loop or close loop controlled via a control or regulating element, for example a valve or a flap. When the exhaust gas recirculation is switched off, pure fresh air can be delivered into the second sector of the entry cross section via this control or regulating element, so that, even without exhaust gas recirculation, a uniform compressor approach flow is ensured.

According to one version, the recirculated first exhaust gas stream and the fresh air are delivered to the compressor entry in a radially stepped manner, the fresh air being delivered via an outer sector of the entry cross section in relation to an axis of rotation of the compressor, and the recirculated first exhaust gas stream being delivered via an inner sector of the entry cross section in relation to the axis of rotation of the compressor. By means of this method, the admixture of oxygen-reduced gas into the cooling air can be avoided or at least reduced. The oxygen concentration of the gases which reach the combustion chamber is thus reduced, as compared with a conventional method in which fresh air is first mixed with oxygen-reduced gas and is then delivered to the compressor. This makes it possible to use a mass flow of gas which is smaller than in the prior art and has a reduced oxygen fraction in order to bring about a specific effect upon combustion.

According to an alternative version, the recirculated first exhaust gas stream and the fresh air are delivered to the compressor entry in a radially stepped manner, the fresh air being delivered via an inner sector of the entry cross section in relation to an axis of rotation of the compressor, and the recirculated first exhaust gas stream being delivered via an outer sector of the entry cross section in relation to the axis of rotation of the compressor.

This makes it possible to use an increased ratio of fresh air to recirculated exhaust gas, as compared with the prior art. Overall, thus, the oxygen content in the exhaust gases can be reduced, the $CO_2$ content can be increased and the mass exhaust gas stream which leaves the power plant and from which, for example, $CO_2$ is separated can be reduced. The reduced mass exhaust gas stream makes it possible to have a reduction in the plant size. The higher $CO_2$ content leads to more effective separation with reduced consumption of auxiliary energy for $CO_2$ separation and therefore to a higher net power output and higher net efficiency of the power plant.

In addition to the method, a gas turbine power plant with exhaust gas recirculation for carrying out the method is the subject of the disclosure. A gas turbine power plant of this type comprises a gas turbine, a waste heat recovery steam generator, a compressor inlet through which an intake stream can flow into a compressor of the gas turbine, and an exhaust gas divider which, during operation, divides the exhaust gases of the gas turbine into a first exhaust gas substream for recirculation into the intake stream of the gas turbine and into a second exhaust gas substream for discharge into the surroundings. According to the disclosure, the compressor inlet is divided into a first sector and a second sector. The compressor flow duct which commences at the compressor entry adjoins the two sectors. Further, a feeder for fresh air is connected to the first sector and a recirculation line for recirculating the first exhaust gas substream from the exhaust gas divider is connected to the second sector. In this case, the second sector reaches so close to the compressor that, when the gas turbine is in operation, the static pressure at the outlet of the second sector is so low that the difference between total pressure and static pressure is greater than or equal to the pressure difference which is required in order to suck a target mass flow into the compressor inlet.

The target mass flow may, for the sake of simplification, be stipulated as a fixed value or be determined as a function of the operating conditions of the gas turbine. Typically, the second sector reaches so close to the compressor that, during operation, the intake stream is accelerated to an extent such that the difference between total pressure and static pressure is greater than 1% of the total pressure.

According to a further embodiment of the gas turbine power plant, when the gas turbine is in operation the static pressure at the outlet of the second sector is so low that the difference between ambient pressure and static pressure at the outlet of the second sector is greater than the difference between the sum of the pressure losses in the recirculation line and all the fittings in the recirculation line and the overpressure in the exhaust gas divider with respect to the ambient pressure.

According to one exemplary embodiment, the first sector for delivering fresh air and the second sector for delivering recirculated first exhaust gas substream are arranged coaxially to one another at their outlets upstream of the compressor entry.

In a further exemplary embodiment, the first sector for delivering fresh air and the second sector for delivering recirculated first exhaust gas substream are designed at their outlets as concentric circular rings.

So that the recirculated exhaust gas substream can be open loop or close loop controlled, according to a further embodiment of the gas turbine power plant the outlet of the second sector of the compressor inlet is designed to be geometrically variable.

According to one exemplary embodiment, the first sector for delivering fresh air and the second sector for delivering recirculated first exhaust gas substream are separated at their outlet by a variable separation element. A variable separation element may comprise at least one displaceable wall or at least one displaceable wall portion. However, the variable separation element may also be an expandable element made from a flexible material or comprise a combination of both.

For example, the variable separation element may be arranged displaceably in the axial direction of the gas turbine axis. In an arrangement of this type, the mass flow of the recirculated first exhaust gas substream is mainly open loop or close loop controlled via the underpressure in the respective axial position in which the separation element ends.

In a further example, the variable separation element is arranged displaceably in the radial direction. By means of radial displacement, the mass flow of the recirculated first exhaust gas substream is open loop or close loop controlled mainly via the outlet area of the second sector.

Further, a combination of an axially and radially displaceable separation element may be envisaged.

In a further embodiment, feeders for introducing the recirculated first exhaust gas substream are arranged so as to be distributed in the circumferential direction, upstream of the compressor entry, concentrically to the shaft of the gas turbine. In this case, the axial distance from the outlet orifices of the feeders to the compressor entry are capable of being set in order to regulate or control the recirculated first mass flow.

In a further embodiment of the gas turbine power plant, the second sector of the compressor entry is connected to the fresh air or to a feeder for fresh air via a control or regulating element. This control or regulating element makes it possible to admix fresh air to the recirculated first exhaust gas substream in a controlled manner. When the gas turbine is under part load and/or is being started, fresh air can therefore be sucked into the second sector of the compressor inlet.

This control or regulating element, to which fresh air (ambient air) is delivered via a line or air duct, is, for example, a flap or a valve. In order to compensate for the pressure losses of the regulating element and of delivery and admixture, a blower may be provided in the feeder. This feeder does not have to issue directly into the second sector of the compressor inlet, but may issue into the recirculation line by which the first recirculated mass exhaust gas stream is returned. For example, it may even issue upstream or an exhaust gas recooler with gas scrubbing, such as, for example, a spray cooler (also designated as a direct contact cooler). In this case, fresh air can be delivered without additional filtering or with only minor filtering.

According to one version, the sectors of the compressor inlet are designed as an inner sector and an outer sector, a feeder for the recirculated first exhaust gas stream being connected to the inner sector of the compressor inlet and a fresh air feeder being connected to the outer sector of the compressor inlet.

By virtue of this arrangement, the admixture of oxygen-reduced gas into the cooling air can be avoided or at least reduced. The oxygen concentration of the gases which reach the combustion chamber is thus reduced, as compared with a conventional method in which fresh air is first mixed with oxygen-reduced gas and is then delivered to the compressor. This makes it possible to use a mass flow of gas which is lower than that of the prior art and has a reduced oxygen fraction in order to bring about a specific effect on combustion during operation.

According to an alternative version, the sectors of the compressor inlet are designed as an inner sector and an outer sector, a feeder for the recirculated first exhaust gas stream being connected to the outer sector of the compressor inlet and a fresh air feeder being connected to the inner sector of the compressor inlet.

This makes it possible to use a ratio of fresh air to recirculated exhaust gas which is higher than that of the prior art. Overall, thus, the oxygen content in the exhaust gases can be reduced, the $CO_2$ content can be increased and the mass exhaust gas stream which leaves the power plant and from which, for example, $CO_2$ is separated can be reduced. The reduced mass exhaust gas stream makes it possible to have a reduction in the plant size. During operation, the higher $CO_2$ content leads to more effective separation with a reduction in consumption of auxiliary energy for $CO_2$ separation and therefore to a higher net power output and higher net efficiency of the power plant.

All the advantages explained can be used not only in the combinations specified in each case, but also in other combinations or alone, without departing from the scope of the disclosure. The disclosure can be applied without restriction to gas turbines having a combustion chamber and to gas turbines having sequential combustion, such as are known, for example, from EP0718470.

BRIEF DESCRIPTION OF THE DRAWINGS

Preferred embodiments of the disclosure are described below by means of the drawings which serve merely explanatory purposes and are not to be interpreted restrictively. In the diagrammatic drawings.

DETAILED DESCRIPTION

Figure 1:
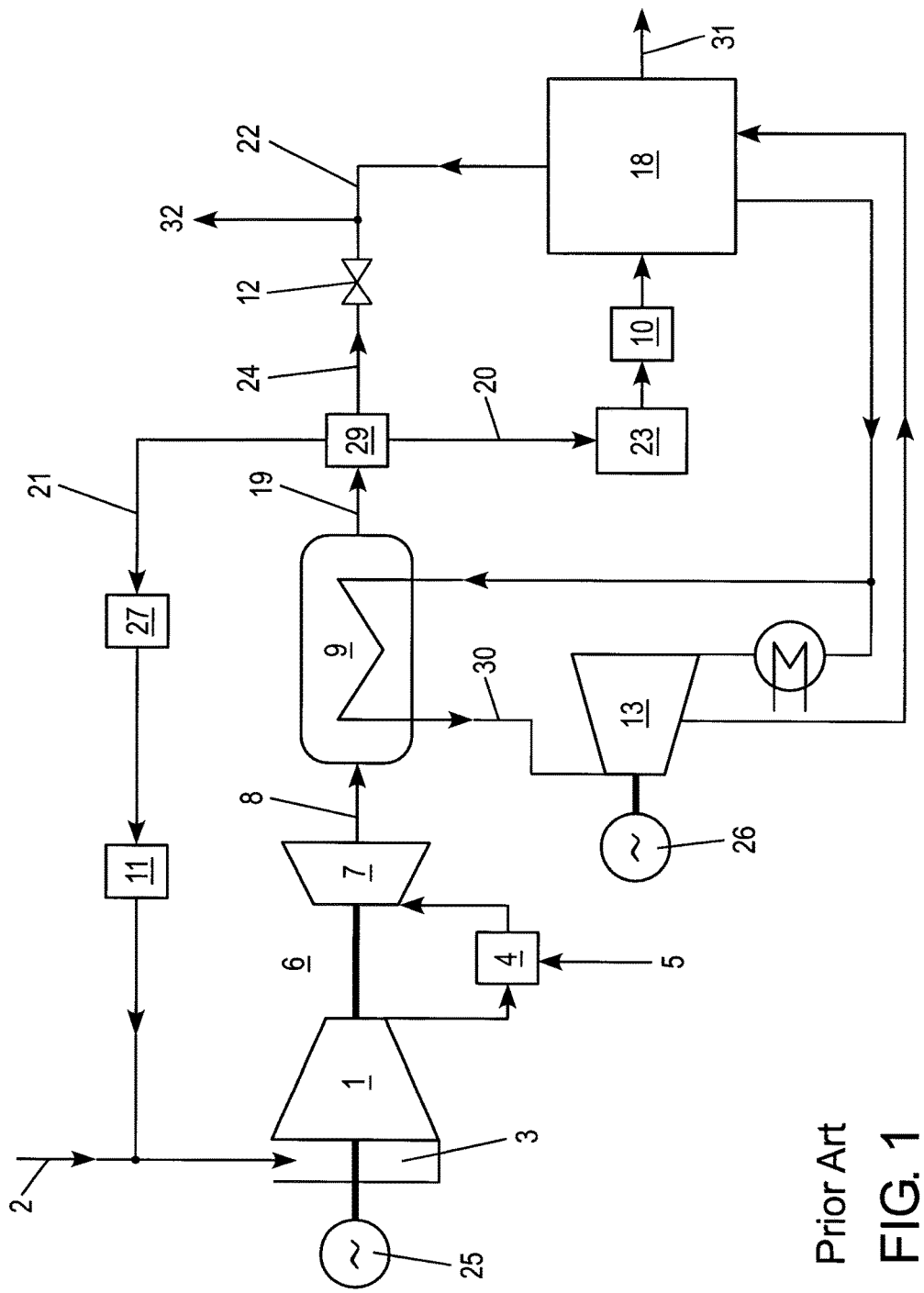
FIG. 1 shows a gas turbine power plant with recirculation of the exhaust gases according to the prior art.

FIG. 1 shows a diagrammatic illustration of the essential elements of a gas turbine power plant with exhaust gas recirculation. The gas turbine 6 comprises a compressor 1, the combustion air compressed therein being delivered to a combustion chamber 4 and being burnt there with fuel 5. The hot combustion gases are subsequently expanded in a turbine 7. The useful energy generated in the turbine 7 is then converted into electrical energy, for example, by means of a first generator 25 arranged on the same shaft.

The hot exhaust gases 8 emerging from the turbine 7 are used, for optimal utilization of the energy still contained in them, in a waste heat recovery steam generator (HRSG) 9 in order to generate fresh steam 30 for a steam turbine 13 or for other plants. The useful energy generated in the steam turbine 13 is then converted into electrical energy, for example, by means of a second generator 26 arranged on the same shaft. The steam circuit is illustrated in simplified form and merely diagrammatically in the example. Various pressure stages, feed water pumps, etc. are not shown since these are not the subject of the invention.

The exhaust gases from the waste heat recovery steam generator 9 are divided, downstream of the waste heat recovery steam generator 9 in such a plant, into a first exhaust gas substream 21 and a second exhaust gas substream 20 in an exhaust gas divider 29 which can be open loop or close loop controlled. The first exhaust gas substream 21 is returned to the intake line of the gas turbine 6 and is mixed with fresh air 2 there. The unreturned second exhaust gas substream 20 is discharged into the surroundings or, as in this example, is cooled further via an exhaust gas recooler 23 and delivered to a $CO_2$ separation system 18. Low-$CO_2$ exhaust gases 22 are discharged from this into the surroundings via a chimney 32. In order to overcome the pressure losses of the $CO_2$ separation system 18 and the exhaust gas line, an exhaust gas blower 10 may be provided. The $CO_2$ 31 separated in the $CO_2$ separation system 18 is typically compressed and diverted for storage or further treatment. The $CO_2$ separation system 18 is supplied via steam extraction with steam branched off from the steam turbine 13.

The second exhaust gas substream may also be led to the chimney 32 directly via an exhaust gas bypass 24 having a bypass flap 12.

The returned first exhaust gas substream 21 is cooled to somewhat above ambient temperature in an exhaust gas recooler 27 which may be equipped with a condenser. A booster or exhaust gas blower 11 for the recirculation stream 21 may be arranged downstream of this exhaust gas recooler 27. This returned first exhaust gas substream 21 is mixed with the fresh air 2 before the mixture is delivered as an intake stream to the gas turbine 6 via the compressor inlet 3.

Figure 2:
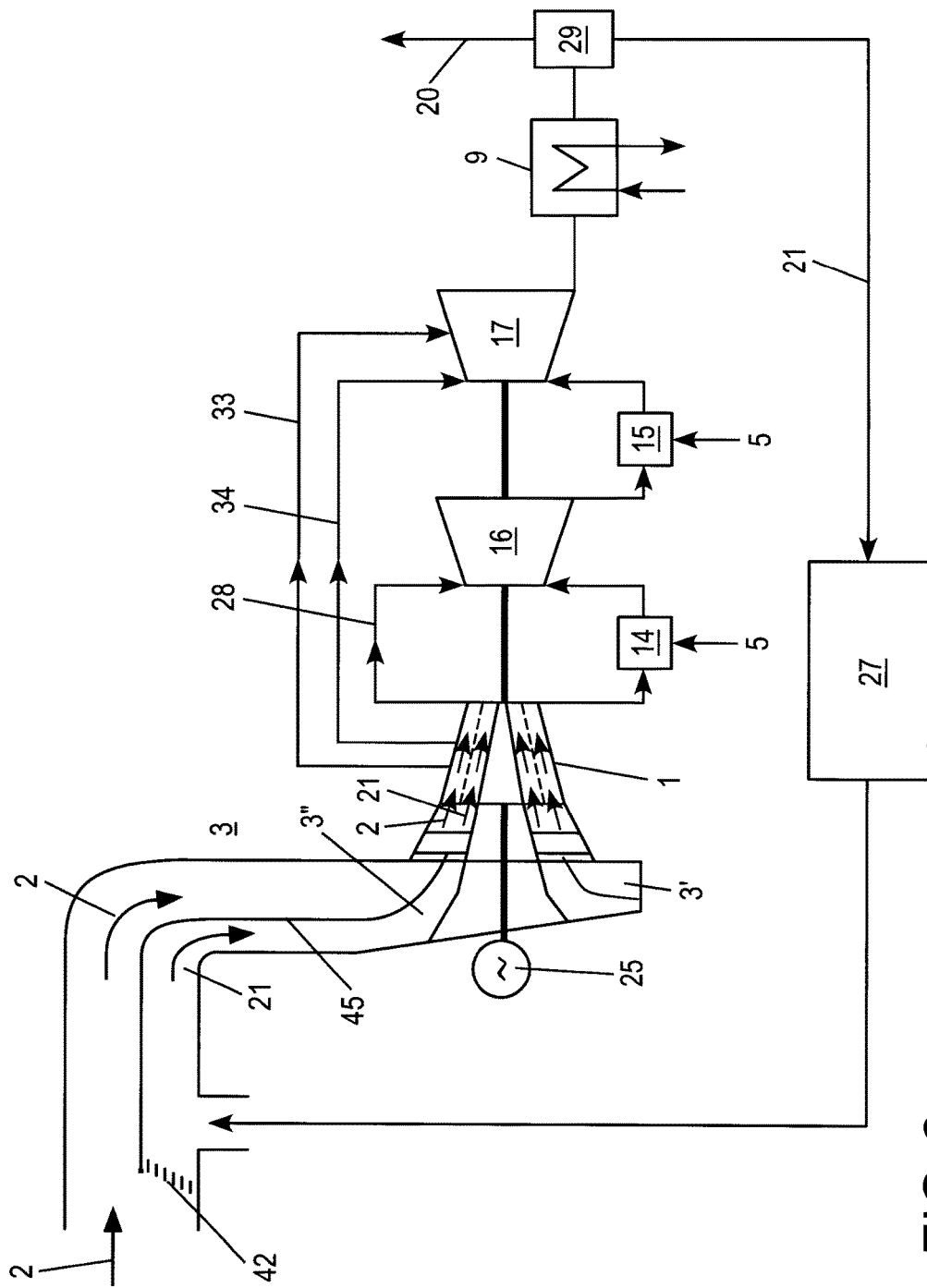
FIG. 2 shows a gas turbine power plant with recirculation of the exhaust gases and introduction of exhaust gases into a region of the compressor inlet with reduced static pressure.

In contrast to FIG. 1, a gas turbine with sequential combustion is illustrated in FIG. 2. The method can be applied to gas turbines having a combustion chamber and to gas turbines having sequential combustion. Correspondingly, versions are also possible for gas turbines having a combustion chamber and for gas turbines having sequential combustion.

FIG. 2 shows diagrammatically an exemplary embodiment of a gas turbine power plant with a compressor inlet which is divided into two sectors, a feeder for fresh air issuing in a first sector 3' of the compressor inlet 3 and a feeder for the recirculated exhaust gas substream 21 issuing into a second sector 3" of the compressor inlet 3. The two inlet sectors 3', 3" adjoin the flow duct of the compressor 1 on that side of the compressor inlet 3 which faces the compressor. The second sector 3" reaches into a region of the compressor inlet 3 in which, when the gas turbine is in operation, the flow is accelerated so sharply that the static pressure has fallen to an extent such that the first exhaust gas substream 21 overcomes the pressure losses in the recirculation line and the pressure loss of the exhaust gas recooler 27.

Low-pressure and medium-pressure cooling gas 33, 34 is branched off from the compressor 1 and delivered for cooling to the hot gas parts of the gas turbine. Further, high-pressure cooling gas 28 is branched off at the end of the compressor or of the following diffuser and is delivered for cooling to the hot gas parts of the gas turbine. FIG. 2 illustrates, for the sake of simplification, only a delivery of cooling gas to the high-pressure turbine 16 and in each case a low-pressure and a medium-pressure cooling gas 33, 34 to the low-pressure turbine 17. For the sake of simplification, a delivery of cooling gas to the combustion chambers 14, 15 is not illustrated, the high-pressure combustion chamber 14 typically being cooled by means of high-pressure cooling air 28 and the low-pressure combustion chamber 15 typically being cooled by means of medium-pressure cooling air 34.

In order to implement a homogeneous velocity profile in the flow to the compressor in the case of different operating states of the gas turbine and the changes in the fraction of recirculated exhaust gas 21 and in the compressor intake quantity which are associated therewith, in the exemplary embodiment shown in FIG. 2 a fresh air regulating element 42 is provided, via which fresh air 2 is admixed to the first exhaust gas substream 21 before said fresh air is introduced into the compressor 1 via the second sector 3" of the compressor inlet 3.

Figure 3:
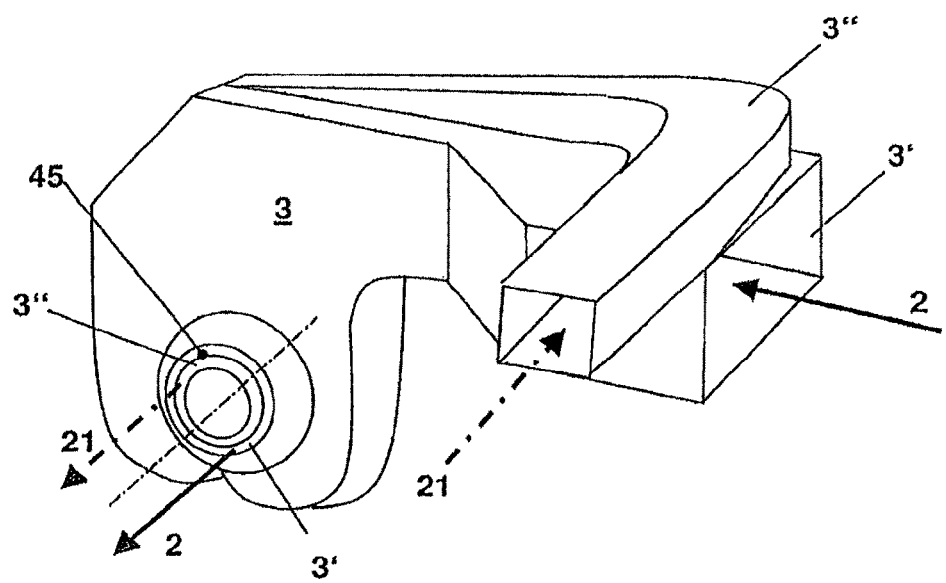
FIG. 3 shows a perspective view of a divided compressor inlet for introducing recirculated exhaust gases into a region of the compressor inlet with reduced static pressure.

FIG. 3 shows in perspective a diagrammatic illustration of a divided compressor inlet for the introduction of exhaust gases into a region of the compressor inlet with reduced static pressure. The fresh air 2 is delivered from one side to the first sector 3' of the compressor inlet 3, is deflected horizontally in this and, after further deflection, is delivered in the direction of the gas turbine axis to the compressor via an annular outlet area.

The recirculated first exhaust gas substream 21 is conducted axially opposite to the main flow direction of the gas turbine to a plane upstream of the compressor inlet 3, is deflected in the second sector 3" of the compressor inlet and is conducted from the side, above the gas turbine axis, upstream of the entry into the gas turbine. As a result of a second deflection, the recirculated first exhaust gas substream 21 is conducted in the direction of the height of the gas turbine axis and is delivered to the compressor, after a further deflection, via an annular outlet area. The two sectors 3', 3" are separated by a partition 45 which reaches into a region having low static pressure, by which the recirculated first exhaust gas substream 21 is sucked into the compressor 1.

Figure 4:
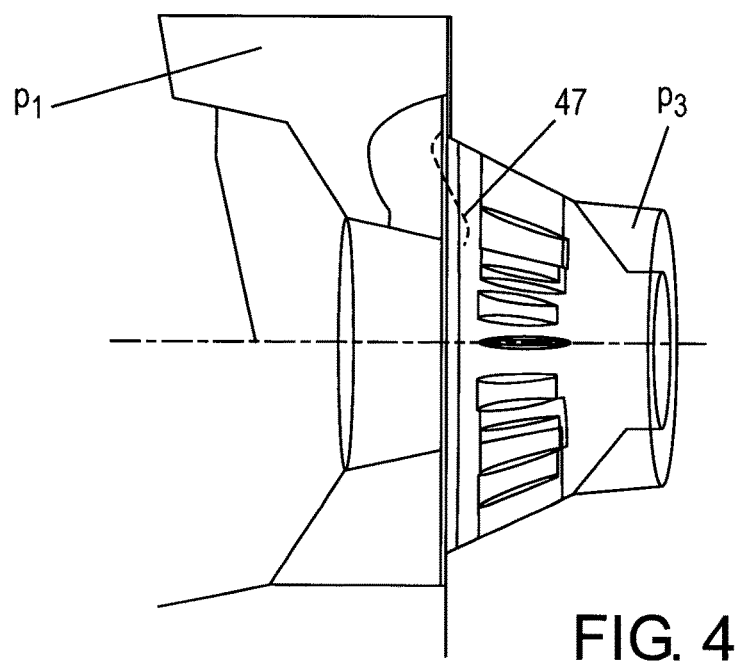
FIG. 4 shows an illustration of the pressure profile in a detail from a compressor inlet upstream of the compressor entry.

The pressure profile in a compressor inlet 3 is shown diagrammatically in FIG. 4. This shows a detail of the compressor inlet 3 upstream of the compressor entry, in which, because of flow acceleration, the pressure falls sharply from an entry pressure $p_1$ until it reaches the compressor entry pressure $p_3$. A 90% isobar 47 is depicted in the example. The static pressure has fallen at this 90% isobar 47 to 90% of total pressure as a result of flow acceleration. When the recirculated first exhaust gas substream is introduced into that region of the compressor inlet 3 which lies downstream of these isobars, 10% of the ambient total pressure is available for conveying the recirculated first exhaust gas substream. Typically, a lowering of the static pressure by 5% is sufficient to bring about a return of the exhaust gas into the compressor inlet. In the case of large recirculation lines with low pressure losses, and taking into account possible overpressure in the exhaust system when the recirculated first exhaust gas substream is branched off, a lesser lowering of the static pressure may be sufficient. Thus, introduction may be possible into a region in which the static pressure is lowered by only 1% or 2% of the total pressure. Depending on the desired outflow velocity of the recirculated first exhaust gas substream at the outlet from the second sector of the compressor inlet, a greater lowering of the static pressure may be required and may amount to up to 20% or 30% of the total pressure.

Figure 5:
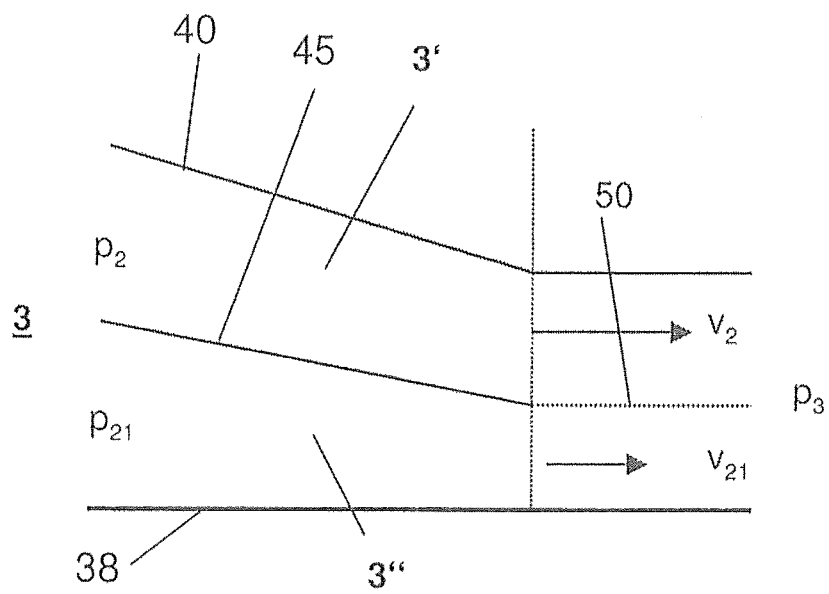
FIG. 5 shows a detail of a compressor inlet with a separation element.

FIG. 5 shows a diagrammatic illustration of a detail of a compressor inlet 3 directly upstream of the compressor. The detail is delimited toward the shaft of the gas turbine by the shaft cover 38 and outwardly by the compressor housing 40. A separation element 45 separates the first sector 3' for the introduction of fresh air 2 from the second sector 3" for introducing the recirculated first exhaust gas substream 3".

The pressure of the fresh air $p_2$ at the entrance of the illustrated detail in the first sector 3' is higher than the pressure of the recirculated first exhaust gas substream $p_{21}$ at the entrance of the illustrated detail in the second sector 3". Both pressures $p_2$, $p_{21}$ are markedly higher than the static pressure at the compressor entry $p_3$. On account of the higher initial pressure, the fresh air is accelerated more sharply in the first sector 3', so that the velocity of the fresh air $v_2$ at the end of the separation element 45 is higher than the velocity of the recirculated exhaust gas substream $v_{21}$. A shear flow separated by a shear layer 50 is thereby formed.

Figure 6:
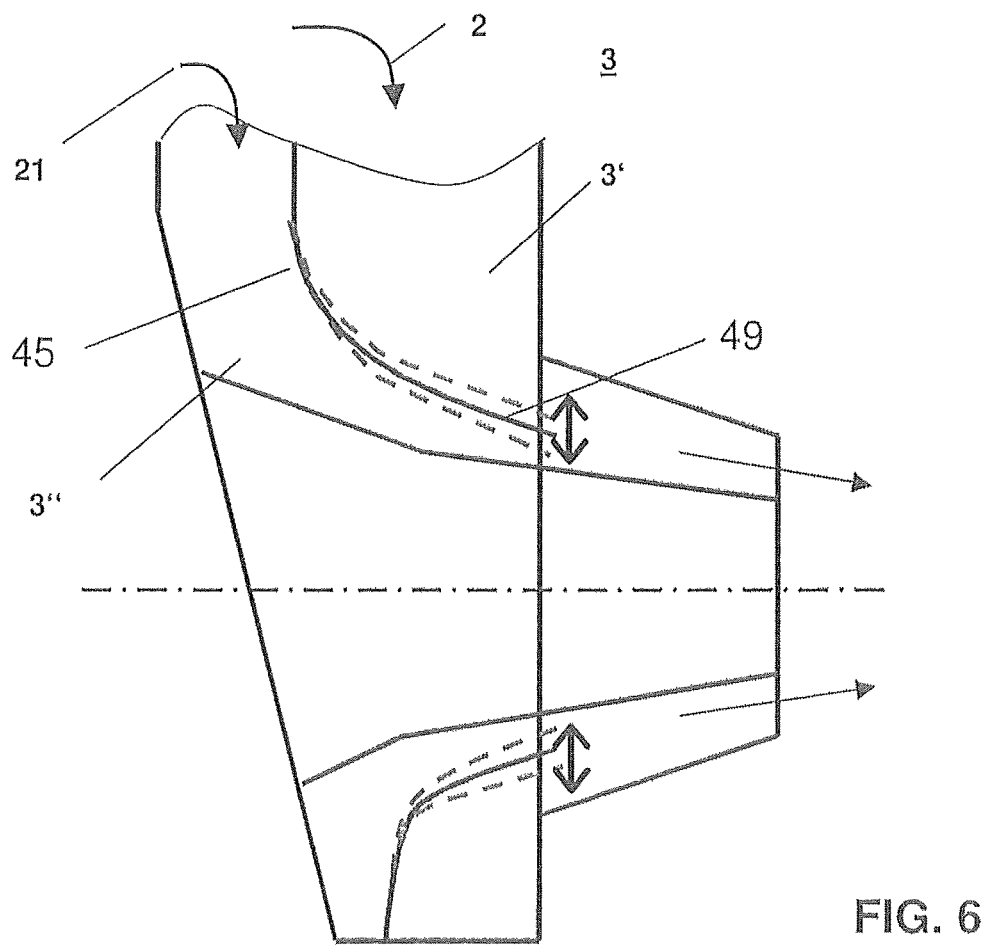
FIG. 6 shows a detail of a compressor inlet with a radially variable separation element.
Figure 7:
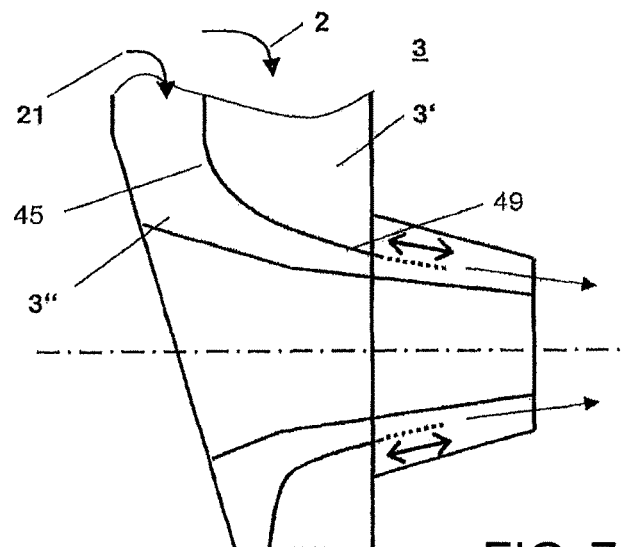
FIG. 7 shows a detail of a compressor inlet with an axially variable separation element.

FIGS. 6 and 7 show examples of variable separation elements 49 which make it possible to regulate or control the recirculated first mass exhaust gas stream 21. Typically, in versions with a variable separation element 49, the compressor inlet 3 is divided into two sectors 3', 3" by a fixed partition 45 and a portion of the fixed partition is replaced or supplemented by a variable separation element 49 solely in the outlet region of the sectors 3', 3".

FIG. 6 shows a diagrammatic illustration of a detail of a compressor inlet 3 with a radially variable separation element 49 which adjoins a fixed partition 45. The outlet end may be widened or narrowed in the radial direction.

In order to increase the recirculated first mass exhaust gas stream 21, the variable separation element 49 may be widened in the radial direction away from the axis of the gas turbine in the flow direction, so that the outlet area from the second sector 3" is increased. This makes it possible, for the same flow velocity, to have the inflow of a higher mass flow of recirculated first exhaust gas substream 21.

In order to reduce the recirculated first mass exhaust gas stream 21, the variable separation element 49 may be pushed together in the radial direction toward the axis of the gas turbine, so that the outlet area from the second sector 3" is reduced. Consequently, for the same flow velocity, the inflow of recirculated first exhaust gas substream 21 is reduced.

As an alternative exemplary embodiment, FIG. 7 shows a diagrammatic illustration of a detail of a compressor inlet 3 with an axially variable separation element 49.

In order to increase the recirculated first mass exhaust gas stream 21, the variable separation element 49 may be displaced in the axial direction (to the right) in the flow direction, so that the outlet from the second sector 3" lies in a region having a higher flow velocity and correspondingly lower static pressure.

In order to reduce the recirculated first mass exhaust gas stream 21, the variable separation element 49 may be displaced in the axial direction (to the left) opposite to the flow direction, so that the outlet from the second sector 3" lies in a region having a lower flow velocity and correspondingly higher static pressure.

Figure 8:
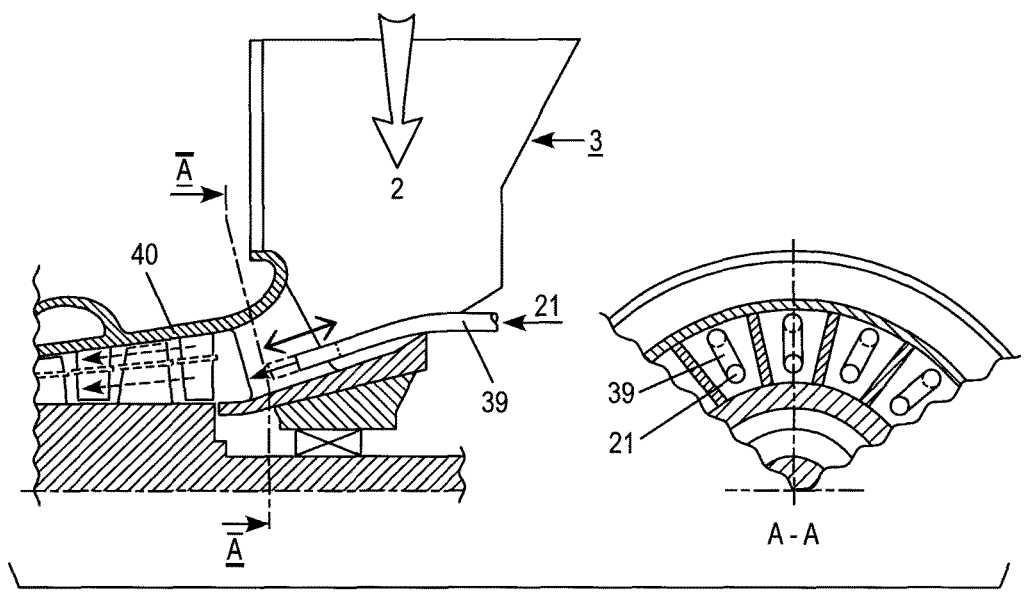
FIG. 8 shows a compressor inlet with recirculation of the exhaust gases through a multiplicity of delivery ducts arranged in the form of a circle around the gas turbine axis in the compressor inlet.

FIG. 8 shows an alternative delivery of the recirculated exhaust gases 21. Instead of a separate delivery of the recirculated exhaust gases 21 via a second sector 3", divided off by a metal sheet, of the compressor inlet for recirculated exhaust gases 21, an undivided compressor inlet 3 is used, into which the recirculated exhaust gases 21 are introduced via a multiplicity of delivery ducts 39 arranged in the form of a ring axially on the inner wall of the compressor inlet 3. Suitable delivery ducts 39 are, for example, pipes or pipe connection pieces, the outlet ends of which are oriented parallel to the main flow in the direction of the compressor entry. In the example shown, the pipe connection pieces reach into the inlet nozzle (bellmouth) of the compressor 1. In the example shown, the axial position of the outlet orifices of the pipes can be regulated. This may take place, for example, by means of a telescopic lengthening or shortening of the pipe or displacement of the entire pipe by means of a flexible pipe connection.

The version with a multiplicity of delivery ducts 39 has the advantage that a partition 45 is not needed for separating the compressor inlet 3. This has the advantage during operation that the ratio of fresh air 2 to recirculated exhaust gas 21 can be changed independently of the area ratio of the inlet sectors. Moreover, the displacement of individual pipes can be implemented mechanically in a simpler way than that of a variable partition.

The invention claimed is:

1. A method for operating a gas turbine power plant with exhaust gas recirculation, the gas turbine power plant including a gas turbine with a compressor having an inlet, a waste heat recovery steam generator, an exhaust gas divider, a recirculation line, and an exhaust gas recooler, said method comprising:
   delivering fresh air into the compressor inlet, the fresh air being accelerated in the compressor inlet;
   controlling the exhaust gas divider to divide exhaust gases from the gas turbine into (1) a first exhaust gas substream for recirculation into an intake stream of the gas turbine and (2) into a second exhaust gas substream for discharge from the gas turbine power plant;
   recirculating the first exhaust gas substream for delivery, separately from the fresh air, into the compressor inlet;
   delivering the recirculated first exhaust gas substream, separately from the fresh air, as far as a region of the compressor inlet in which the fresh air is accelerated to an extent such that a difference between total pressure and static pressure in the accelerated fresh air is greater than or equal to a pressure difference for sucking a target mass flow of the recirculated first exhaust gas substream into the compressor inlet;
   introducing the recirculated first exhaust gas substream to the accelerated fresh air via a plurality of delivery ducts arranged so as to be distributed circumferentially, upstream of the compressor, on a diameter of an intake duct and concentrically to a shaft of the gas turbine; and
   controlling a quantity of the recirculated first exhaust gas substream by changing an axial position of outlet orifices of the plurality of delivery ducts relative to the compressor inlet.

2. The method as claimed in claim 1, comprising:
   conducting fresh air into a flow duct of the recirculated first exhaust gas substream via a control or regulating element when the gas turbine is under part load and/or is being started.

3. A gas turbine power plant, comprising:
   a gas turbine;
   a waste heat recovery steam generator;
   a compressor having a compressor inlet;
   an exhaust gas divider configured to, during operation, divide exhaust gases (1) into a first exhaust gas substream for recirculation into an intake stream of the gas turbine and (2) into a second exhaust gas substream for discharge from the gas turbine power plant;
   a plurality of ducts for introducing the recirculated first exhaust gas substream to fresh air delivered to the compressor inlet in the intake stream, the plurality of ducts being arranged so as to be distributed circumferentially, upstream of the compressor, on a diameter of an intake duct and concentrically to a shaft of the gas turbine, an axial distance from outlet orifices of the plurality of ducts to the compressor inlet being adjustable in order to regulate or control a quantity of the recirculated first exhaust gas substream, the outlet orifices being sufficiently close to the compressor that, when the gas turbine is in operation, a static pressure at the outlet orifices is sufficiently low that a difference between total pressure and static pressure of the intake stream is greater than or equal to a pressure difference which is required in order to suck a target mass flow of the recirculated first exhaust gas substream into the compressor intel; and a recirculation line for recirculating the first exhaust gas substream from the exhaust gas divider and connected to the plurality of ducts.

4. The gas turbine power plant as claimed in 3, wherein the recirculation line is connected to an inlet for fresh air via a control or regulating element.

* * * * *